United States Patent [19]

Fortsch

[11] Patent Number: 5,193,251
[45] Date of Patent: Mar. 16, 1993

[54] CABLE TIE HAVING IMPROVED LOCKING BARB

[75] Inventor: William Fortsch, Bernardsville, N.J.

[73] Assignee: Thomas & Betts Corporation, Bridgewater, N.J.

[21] Appl. No.: 911,603

[22] Filed: Jul. 10, 1992

Related U.S. Application Data

[63] Continuation of Ser. No. 562,310, Aug. 2, 1990, abandoned.

[51] Int. Cl.$^5$ ............................................. B65D 63/14
[52] U.S. Cl. ................................. 24/16 PB; 24/30.5 P
[58] Field of Search ............... 24/16 R, 16 PB, 17 AP, 24/30.5 P; 248/74.3; 292/318–322, 325

[56] References Cited

U.S. PATENT DOCUMENTS

| | | | |
|---|---|---|---|
| 3,102,311 | 9/1963 | Martin et al. | 24/16 |
| 3,186,047 | 6/1965 | Schwester et al. | 24/16 |
| 3,397,430 | 8/1968 | Pearl | 24/16 |
| 3,486,201 | 12/1969 | Bourne | 24/16 |
| 3,588,961 | 6/1971 | Farago | 24/16 |
| 3,739,429 | 6/1973 | Kohke | 24/16 |
| 3,875,618 | 4/1975 | Schuplin | 24/16 |
| 4,422,217 | 12/1983 | Barrette | 24/16 |
| 4,445,877 | 5/1984 | Love et al. | |
| 4,498,507 | 2/1985 | Thompson | |
| 4,653,155 | 3/1987 | Hara | 24/16 |

*Primary Examiner*—James R. Brittain
*Attorney, Agent, or Firm*—Robert M. Rodrick; Salvatore J. Abbruzzese

[57] ABSTRACT

A bundling tie for use in looping about a plurality of cables includes a locking head and elongate strap. A pair of locking barbs are movably supported in the head, each barb having an engagement portion for locking engagement with a strap end upon insertion of the strap ends into the head. Each barb includes a knife-like element for biting insertion into the strap and a blunt stop wall adjacent the knife-like element for limiting the depth of insertion of the knife-like element into the strap.

5 Claims, 2 Drawing Sheets

CABLE TIE HAVING IMPROVED LOCKING BARB

This is a continuation of copending application(s) Ser. No. 07/562,310 filed on Aug. 2, 1990, abandoned.

FIELD OF INVENTION

The present invention relates generally to bundling ties used to support a plurality of electrical cables or similar items and more particularly relates to a bundling tie including a head and strap and an improved barb for locking the strap in the tie head.

BACKGROUND OF THE INVENTION

The use of bundling ties to bundle a plurality of elongate objects such as electrical wires or cables has long been known. One early example of such a bundling tie is shown in U.S. Pat. No. 3,102,311. Typically, bundling ties include a strap which may be looped around a bundle of articles and secured in a head portion which locks the strap thereto.

Locking mechanisms used in bundling ties basically take two forms. One approach has been the use of integrally formed locking means pivotally carried by the head of the tie. Such locking means includes a toothed plastic pawl which engages corresponding teeth on the tail of the strap. Advantages of locking means of this type are readily apparent in that the strap can be integrally molded with no secondary operation needed for providing the locking means. An example of such a bundling tie is shown and described in U.S. Pat. No. 3,486,201. One distinct disadvantage of a tie of this construction is that it requires intricate molding techniques to form the tie. Both the pawl and the tail must include complimentary ratchet teeth thereon for locking purposes. Deformation of the interlocking plastic teeth could cause undesirable pullout of the tail from the tie head. Also, the teeth and the tail form stress points which weaken the tie and could cause undesired breakage.

A second technique for forming locking means in a bundling tie head includes the use of a metallic barb embedded into the base of the tie head at an angle to the inserted tail. This provides a self-clinching device which bites into the tail of the tie to securely retain the strap in the head. An example of a bundling tie having a metallic barb is shown and described in U.S. Pat. No. 3,186,047. The metal barb of the tie of the '047 patent actually bites into the inserted tail. Thus, there is no need to provide complimentary teeth on the tail as is necessary with the device of the '201 patent. The biting engagement of the metal barb into the tail portion of the strap provides superior pullout resistance and results in a smooth body tail which has superior strength. However, since locking engagement of the head and the tail is achieved by the metal barb actually digging into the strap, there could be a tendency for the metallic barb to dig too deeply into the strap, thus weakening the strap at the point of engagement. It is therefore desirable to provide a barb for a bundling tie head which will limit the depth of insertion of the barb into the strap, thereby preventing the severing of the strap thereat and increasing tensile and shear strength of the tie.

SUMMARY OF THE INVENTION:

It is an object of the present invention to provide a self-locking bundling tie of the type including a locking head and an elongate strap where the head includes locking means for securing the strap in the head.

It is a further object of the present invention to provide a metallic barb in a bundling tie head which bites into the strap inserted in the head to secure the strap in the head.

It is a still further object of the present invention to provide a metallic barb for a bundling tie head which will limit the depth of insertion of the barb into the strap of the tie to reduce the tendency to sever the strap thereat.

In the efficient attainment of these and other objects the present invention provides a bundling tie for bundling elongate elements. The bundling tie includes an elongate strap and a head having a passage therethrough to receive one end of the strap. A locking barb is movably supported in the head. The barb includes an engagement portion extending into the head passage for providing locking engagement with the strap inserted therethrough. The engagement portion includes a knife-like element thereon for biting insertion into the strap and a blunt stop wall adjacent the knife-like element for limiting the depth of insertion of the knife-like element into the strap.

As shown by way of preferred embodiment herein, the present invention provides a bundling tie including an elongate bundling strap having a tail at one end thereof. A head having an aperture therethrough insertably receives the tail of the strap. A metallic barb is movably supported by the head and includes a strap engagement portion extending into the aperture for biting engagement with the strap upon insertion of the tail into the aperture. The strap engagement portion includes a pair of spaced-apart piercing projections which pierce into the strap. A blunt wall positioned between the pair of piercing projections limits the amount of piercing insertion of the projections into the strap.

DETAILED DESCRIPTION OF THE PREFERRED EMBODIMENT

Figure 1:
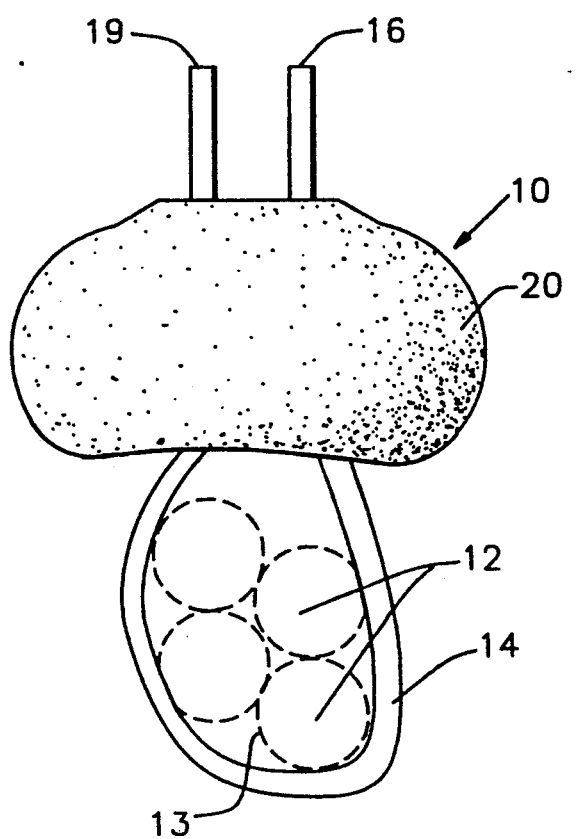
FIG. 1 is a front plan view of the bundling tie of the present invention shown looped around a bundle of electrical cables shown in phantom.

Referring to FIG. 1, bundling tie 10 of the present invention is shown looped around a plurality of electrical cables 12 which are formed into a bundle 13. Bundling tie 10 is typically formed of high-strength molded plastic such as nylon, and is suitable for use both indoors and outdoors. Bundling tie 10 includes an elongate strap 14 having opposed ends 16 and 18 which are designed to be wrapped around cable bundle 13.

Strap 14 typically has a rectangular cross-sectional shape although other shapes may be employed. Ends 16 and 18 are secured within head 20 of bundling tie 10. Head 20, additionally shown in FIGS. 2 and 3, includes a pair of side-by-side passageways 22 and 24 extending through head 20 for accommodating respectively ends 16 and 18 of strap 14. In order to secure ends 16 and 18 of strap 14 in head 20, a pair of metallic barbs 26 and 28 are supported by head 20 and extend into passageways 22 and 24.

As barb 26 is identical to barb 28 reference will be made to barb 26 shown in FIG. 4.

Figures 2, 3:
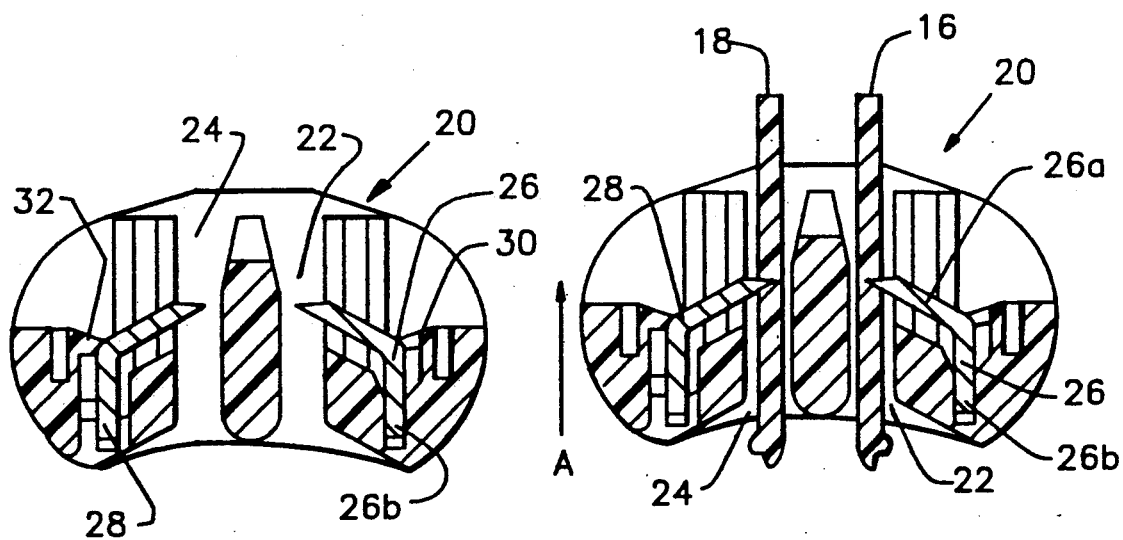
FIG. 2 is a vertical sectional showing of the head of the bundling tie of FIG. 1.
FIG. 3 is a vertical sectional showing of the head of the bundling tie of FIG. 1 with the strap shown therein.
Figure 4:
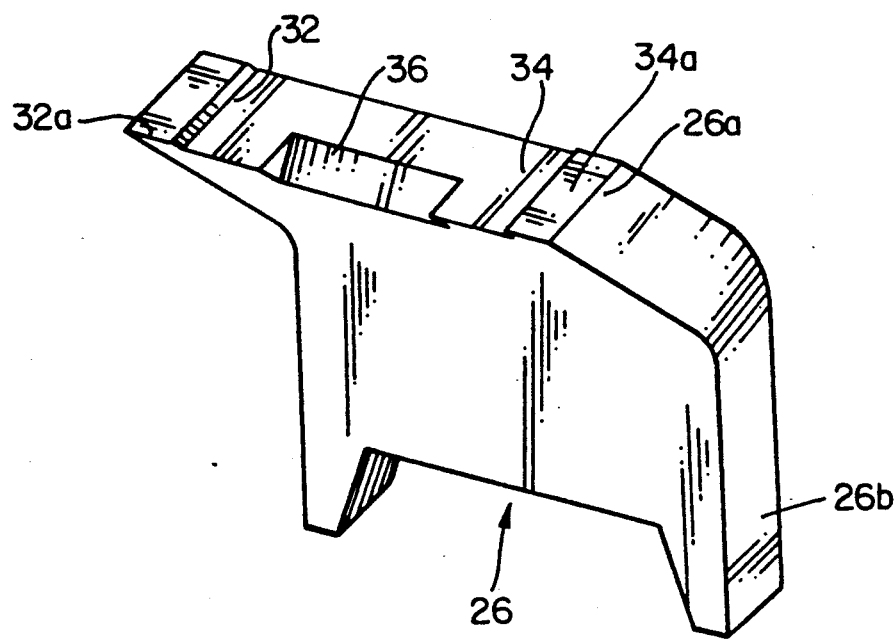
FIG. 4 is a perspective showing of the improved metallic barb used in the bundling tie head shown in FIG. 1.

Referring now to FIG. 4, barb 26 includes a forward engagement portion 26a which as shown in FIGS. 2 and 3, extends into passageway 24 and a rear mounting portion 26b, which as shown in FIG. 2, is supported in head 20 by a flexible support hinge 30.

In use, strap 14 is coiled around a bundle 13 of cables 12 (FIG. 1). As shown in FIG. 3, each end 16 and 18 is inserted through passageways 22 and 24 respectively in the direction of arrow A. The insertion of ends 16 and 18 causes barbs 26 and 28 to be pushed back against flexible hinges 30 and 32 to allow the ends 16 and 18 to be inserted through passageways 22 and 24. Ends 16 and 18 are pulled snugly until strap 14 is wrapped tightly around cables 12 (FIG. 1). Withdrawal of ends 16 and 18 from passageways 22 and 24 in a direction opposite arrow A is prevented by the biting contact of engagement portion 26a with ends 16 and 18. Any attempt to withdraw either end 16 or 18 from passageways 22 or 24 causes cable engagement portion 26a to dig in strap 14.

The locking engagement of barbs 26 and 28 with strap ends 16 and 18 is similar to that shown and described in the above-identified '047 patent. The present invention thus permits the ends 16 and 18 of strap 14 to be drawn through head 20 in the direction of arrow A while preventing retraction of either strap end 14 or 16 in the opposite direction. In order to prevent engagement portion 26a of barb 26 from biting entirely through strap 14 and thus severing the strap thereat, engagement portion 26a includes a stop mechanism for limiting the depth of insertion of engagement portion 26a into the body of strap 14.

Figure 5:
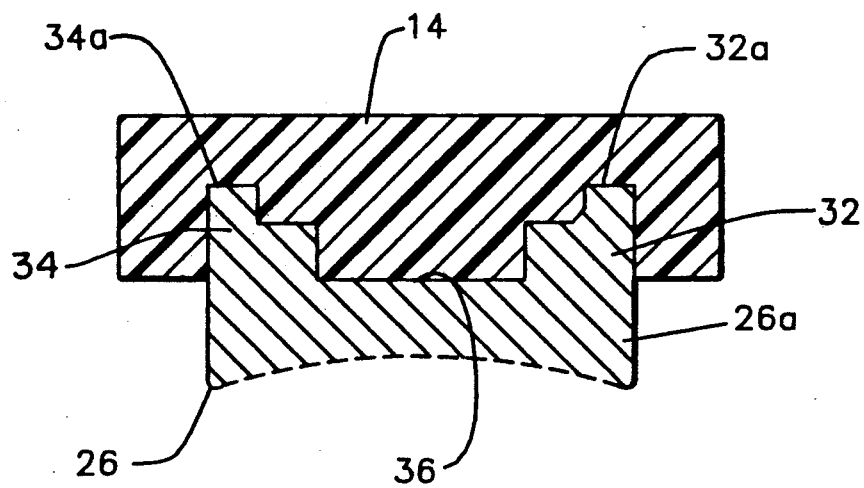
FIG. 5 shows in section, the penetration of the metallic barb of FIG. 4 into the strap shown in FIG. 1.

Referring now to FIGS. 4 and 5, engagement portion 26a of barb 26 includes a pair of knife-like projecting elements 32 and 34 spaced on either side of barb 26. In order to facilitate entry of projecting elements 32 and 34 into strap 14, end projections 32a and 34a respectively are provided. Engagement portion 26a further includes a stop wall 36 positioned between projecting elements 32 and 34. Stop wall 36 is recessed from projecting elements 32 and 34 and includes a flat planar surface perpendicular to the direction of extension of projecting elements 32 and 34. Knife-like projecting elements 32 and 34 are designed for biting engagement into the body of strap 14. Upon an attempt to withdraw ends 16 and 18 from head 20 (FIG. 3) projecting elements 32 and 34 will dig into the body of strap 14. The depth of insertion of projecting elements 32 and 34 will be limited by stop wall 36. The blunt planar surface formed thereby limits the amount of insertion of projecting elements 32 and 34.

As shown in FIG. 5, engagement portion 26a of barb 26 will dig into the body of strap 14 until stop wall 36 contacts strap 14. The blunt surface formed by stop wall 36 prevents further insertion of engagement portion 26a into strap 14. By accurately controlling the relative positions of projecting elements 32 and 34 and stop wall 36, the exact depth to which projecting element 26a projects into strap 14 may be controlled. This results in the shear and tensile strength of the tie being increased as the depth to which the barb bites into the strap is limited.

In the preferred embodiment of the present invention a pair of barbs 26 and 28 are mounted in head 20 for receipt of a headless elongate strap 14. However, the present invention may also be employed with a single barb 26 within a head of a bundling tie having a strap formed integrally therewith.

In addition, other forms for the stop wall of barb 26 may be employed. For example, the stop wall may be in the form of laterally projecting ears which serve to limit the depth of insertion of projecting elements 32 and 34 into the body of strap 14.

Various other changes to the foregoing described and shown structures would now be evident to those skilled in the art. Accordingly, the particularly disclosed scope of the invention is set forth in the following claims.

I claim:

1. A bundling tie comprising:
   an elongate bundling strap having a tail at one end thereof and a smooth planar surface;
   a bundling head having an aperture therethrough for insertable receipt said tail of said strap; and
   a metallic barb movably supported by said head having a strap engagement portion extending into said aperture for engagement with said strap upon said insertion of said tail into said aperture, said strap engagement portion including a pair of spaced apart piercing projections for piercing into said smooth planar surface of said strap and a blunt wall between said piercing projections for limiting the amount of piercing insertion of said projections into said strap, said blunt wall including a planar wall surface positioned substantially parallel to said smooth planar surface of said strap when said strap tail is inserted through said aperture.

2. A bundling tie of claim 1 wherein said bundling strap is formed from plastic material.

3. A bundling tie comprising:
   an elongate strap having a first end, an opposed second end and a planar body; and
   a head having first and second passages therethrough for respective receipt of said first and second strap ends;
   first and second locking barbs supported by said head, each of said barbs having a projecting portion extending into respective ones of said first and second passages for locking engagement with said strap ends;
   each said projecting portion including a knife-like element for piercing insertion into said respective strap end and a blunt wall adjacent said knife-like element for limiting said insertion of said knife-like element into said respective strap end, said blunt wall including a planar wall surface positioned substantially parallel to said planar body of said strap when said strap ends are received in said passages of said head.

4. A bundling tie of claim 3 wherein said first and second locking barbs are metallic.

5. A bundling tie of claim 3 wherein said elongate strap is formed from plastic material.

* * * * *

REEXAMINATION CERTIFICATE (2871st)

United States Patent [19]
Fortsch

[11] B1 5,193,251
[45] Certificate Issued May 7, 1996

[54] CABLE TIE HAVING IMPROVED LOCKING BARB

[75] Inventor: William Fortsch, Bernardsville, N.J.

[73] Assignee: Thomas & Betts Corporation, Bridgewater, N.J.

Reexamination Request:
No. 90/003,827, May 10, 1995

Reexamination Certificate for:
Patent No.: 5,193,251
Issued: Mar. 16, 1993
Appl. No.: 911,603
Filed: Jul. 10, 1992

Related U.S. Application Data

[63] Continuation of Ser. No. 562,310, Aug. 2, 1990, abandoned.

[51] Int. Cl.$^6$ ........................................... B65D 63/14
[52] U.S. Cl. ........................................... 24/169 B; 24/30.5 P

[56] References Cited

U.S. PATENT DOCUMENTS

| | | | |
|---|---|---|---|
| 3,102,311 | 9/1963 | Martin et al. | 24/16 |
| 3,186,047 | 6/1965 | Schwester et al. | 24/16 |
| 3,397,430 | 8/1968 | Pearl | 24/16 |
| 3,486,201 | 12/1969 | Bourne | 24/16 |
| 3,588,961 | 6/1971 | Farago | 24/16 |
| 3,739,429 | 6/1973 | Kohke | 24/16 |
| 3,875,618 | 4/1975 | Schuplin | 24/16 |
| 4,422,217 | 12/1983 | Barrette | 24/16 |
| 4,445,877 | 5/1984 | Love et al. | |
| 4,498,507 | 2/1985 | Thompson | |
| 4,653,155 | 3/1987 | Hara | 24/16 |
| 4,933,669 | 2/1991 | Dyer | 248/61 |
| 5,102,075 | 4/1992 | Dyer | 248/61 |

Primary Examiner—James R. Brittain

[57] ABSTRACT

A bundling tie for use in looping about a plurality of cables includes a locking head and elongate strap. A pair of locking barbs are movably supported in the head, each barb having an engagement portion for locking engagement with a strap end upon insertion of the strap ends in the head. Each barb includes a knife-like element for biting insertion into the strap and a blunt stop wall adjacent the knife-like element for limiting the depth of insertion of the knife-like element into the strap.

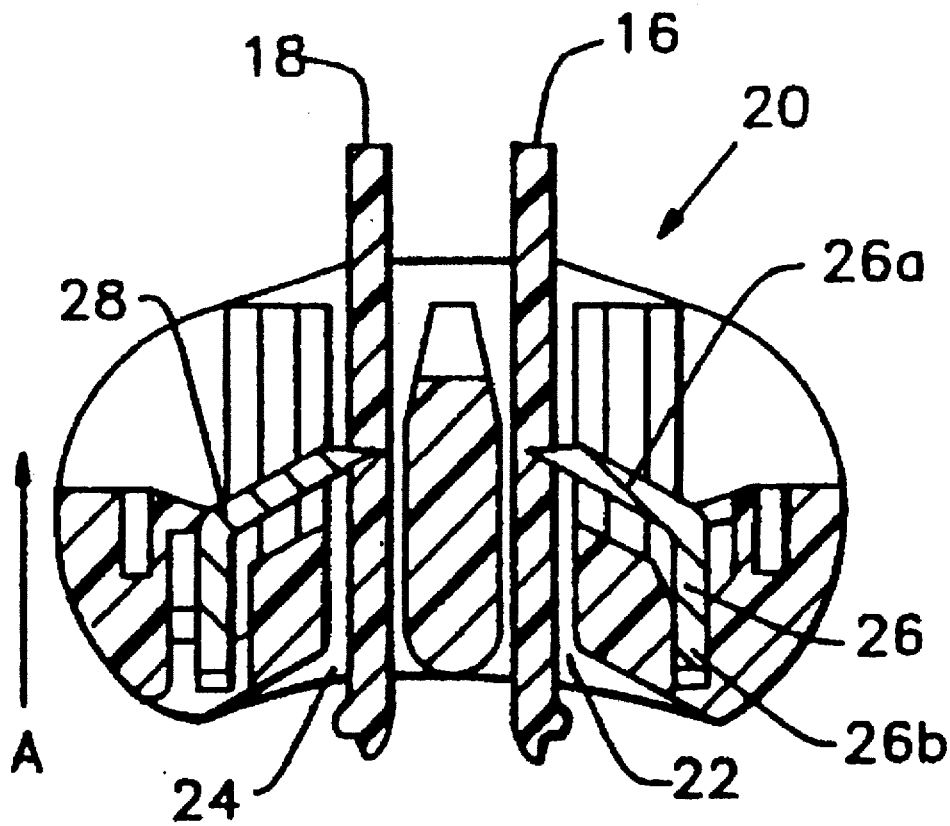

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *